Patented Mar. 9, 1943

2,313,194

UNITED STATES PATENT OFFICE 2,313,194

PROCESS FOR THE REMOVAL OF SILICA FROM WATER

Sebastien Otto Alfred Fiedler and Géza Victor Austerweil, Paris, France; vested in the Alien Property Custodian No Drawing. Application March 10, 1939, Serial No. 261,068. In France March 15, 1938

3 Claims. (Cl. 210—23)

Various processes have been proposed for the removal of the silica which is contained in water. It has been chiefly proposed to filter the water through metal oxides or hydroxides obtained in the gelatinous state, such as alumina, oxide of iron, tin, magnesium, or the like, in order to retain the silica, but the regeneration of such substances, when they have become saturated with silica, is found to be a tedious matter; on the other hand, the silica is often only partially retained by such bodies when used in the gelatinous state. It has further been proposed to remove the silica by a treatment with lime or with hydrate of magnesium, but such removal will only take place if at the same time, there is formed a precipitate having a sufficient volume to carry off all of the dispersed colloidal silica as is the case, for instance, in the treatment of water by the well-known lime-soda process, in which, in some cases, the calcium carbonate precipitate is sufficient to carry off a certain part of the silica; the same action takes place by the addition of trisodium phosphate to water; however the silica will only be precipitated in substantial amounts when the treatment of the water provides an amount of precipitate which is sufficient to carry off the silica. It has also been proposed to employ barium aluminate, but this substance will only partially precipitate the silica, and it has the drawback of being somewhat expensive.

According to the present invention, we have found that the silica can be almost entirely removed from water which even contains large quantities of the same, if such water is treated with a substance containing as active ingredient aluminate of calcium and being substantially free of silicates, said substance being preferably in the form of large surfaces or in the finely divided state.

The insoluble aluminate of calcium will react with the bicarbonate of calcium dissolved in the water to be purified; it is partially hydrolyzed, and the lime set free will form with the bicarbonate various carbonates which precipitate at the the same time that the aluminum hydroxide is set free. In the nascent state, this aluminum hydroxide will rapidly fix the silica contained in the water, and the insoluble complex-compound thus formed will readily deposit. At the same time, the alkalinity (pH) of the water will increase by reason of the partial conversion (by means of the lime resulting from the hydrolysis of the calcium aluminate) of its bicarbonates into sesquicarbonates or carbonates of calcium, which will also precipitate, thus furthering the deposit of the complex compound consisting of silica and aluminum hydroxide.

The increase of the pH thus obtained will also further the precipitation of the silica, while at the same time the temporary hardness of the water is reduced.

One of the simplest forms for carrying into effect the process according to the invention, is to make use of calcium aluminate as it is found mixed with calcium ferrites in the quick setting cements. These latter can be used as they are, or preferably after the setting, but in a very finely-divided state or in the form a large surfaces.

The use of the said substances for the purifying of water, and chiefly for the removal of silica, may take place by distributing the reacting mass in fine grains upon an inert support composed of large grains consisting, for example, of anthracite, dolomite, or the hydrated quick-setting cement itself, or by the use of a continuous decanting apparatus such as the known apparatus for the purification of water by the lime-soda process.

When the said substances are used in the form of powder or slime supported by inert layers, it is possible, when the purifying power of the active substance becomes weak, to lift it up by a counter-current of water in order to remove the powder or slime, which is then replaced by another active layer of the substances in the form of fine powder.

The said treatment can be followed by a treatment of the water by means of hydrogen exchangers and anion exchangers, thus obtaining water whose purity is comparable with that of distilled water, or it may be simply followed by a treatment with a cation exchanger and/or an anion exchanger.

Having now described our invention what we claim as new and desire to secure by Letters Patent is:

1. A process for removing silica from water, comprising contacting the water to be purified with a substance containing as active ingredient aluminate of calcium and being substantially free of silicates.

2. A process for removing silica from water, comprising contacting the water to be purified with a quick-setting cement containing a considerable amount of aluminate of calcium and being substantially free of silicates.

3. A process for removing silica from water, comprising contacting the water to be purified with a finely divided substance containing as active ingredient aluminate of calcium and being substantially free of silicates.

SEBASTIEN OTTO ALFRED FIEDLER.
GÉZA VICTOR AUSTERWEIL.